(12) United States Patent
Apostolopoulos

(10) Patent No.: US 11,744,398 B2
(45) Date of Patent: Sep. 5, 2023

(54) SYSTEM AND METHOD FOR REAL-TIME AUTOMATIC SCORING OF PHYSICAL AND OPERATIONAL PROPERTIES OF AUTOMATIC ESPRESSO COFFEE MACHINES FOR BOTH MECHANICAL AND END-USER OPTIMAL USE CRITERIA

(71) Applicant: Vasileios Apostolopoulos, Marousi (GR)

(72) Inventor: Vasileios Apostolopoulos, Marousi (GR)

( * ) Notice: Subject to any disclaimer, the term of this patent is extended or adjusted under 35 U.S.C. 154(b) by 1142 days.

(21) Appl. No.: 16/350,763

(22) Filed: Jan. 4, 2019

(65) Prior Publication Data

US 2020/0214492 A1    Jul. 9, 2020

(51) Int. Cl.
| A47J 31/52 | (2006.01) |
| A47J 31/46 | (2006.01) |
| A47J 31/24 | (2006.01) |
| A47J 31/56 | (2006.01) |
| A47J 31/60 | (2006.01) |
| A47J 31/42 | (2006.01) |

(52) U.S. Cl.
CPC ............. *A47J 31/521* (2018.08); *A47J 31/24* (2013.01); *A47J 31/42* (2013.01); *A47J 31/468* (2018.08); *A47J 31/5251* (2018.08); *A47J 31/5253* (2018.08); *A47J 31/5255* (2018.08); *A47J 31/56* (2013.01); *A47J 31/605* (2013.01)

(58) Field of Classification Search
CPC .. A47J 31/525; A47J 31/5251; A47J 31/5253; A47J 31/5255; A47J 31/42

USPC .......................................... 99/281, 282, 283
See application file for complete search history.

(56) References Cited

U.S. PATENT DOCUMENTS

| 2008/0050480 | A1* | 2/2008 | Doglioni Majer .... A47J 31/525 99/280 |
| 2012/0245732 | A1* | 9/2012 | Yoakim ................. G07F 13/065 709/224 |
| 2015/0320255 | A1* | 11/2015 | She ......................... A47J 31/44 99/285 |
| 2016/0055599 | A1* | 2/2016 | Illy ..................... G06Q 30/0635 705/15 |
| 2018/0000108 | A1* | 1/2018 | Boggavarapu ...... A47J 31/5251 |
| 2019/0014942 | A1* | 1/2019 | Juve ..................... A47J 31/002 |
| 2020/0367689 | A1* | 11/2020 | Illy ..................... A47J 31/5255 |

FOREIGN PATENT DOCUMENTS

| EP | 2764806 A1 * | 8/2014 | ............... A47J 31/52 |
| GB | 2576379 A * | 2/2020 | ........... B67D 1/0884 |
| WO | WO-2015157475 A1 * | 10/2015 | ............... A23F 3/18 |
| WO | WO-2016070232 A1 * | 5/2016 | ........ A47J 27/21083 |

* cited by examiner

*Primary Examiner* — Reginald Alexander

(57) ABSTRACT

A system and method is provided for real time automatic scoring of physical and operational properties of automatic espresso coffee machines applicable both for a single machine and a network of machines. The scoring scheme includes semantic context based on automatic monitoring of operation process variables and end-user annotations and scoring criteria. The method is decoupled from the coffee machine's controlling apparatus and utilizes a sensory reading device that is able to communicate over standard and proprietary network protocols with sensors and with other devices of the same type over direct, peer to peer or standard network, and Internet connections.

7 Claims, 5 Drawing Sheets

SYSTEM AND METHOD FOR REAL-TIME AUTOMATIC SCORING OF PHYSICAL AND OPERATIONAL PROPERTIES OF AUTOMATIC ESPRESSO COFFEE MACHINES FOR BOTH MECHANICAL AND END-USER OPTIMAL USE CRITERIA

CROSS REFERENCE TO RELATED APPLICATIONS

The instant application claims priority to U.S. Provisional Application Ser. No. 62/613,437, filed on Jan. 4, 2019.

STATEMENT REGARDING FEDERALLY SPONSORED RESEARCH OR DEVELOPMENT (IF APPLICABLE)

Not Applicable.

REFERENCE TO SEQUENCE LISTING, A TABLE, OR A COMPUTER PROGRAM LISTING COMPACT DISC APPENDIX (IF APPLICABLE)

Not Applicable.

BACKGROUND OF THE INVENTION

A mainstream method to produce espresso coffee for every-day coffee consumption purposes, usually offered in coffee cups, uses an espresso coffee machine. Such a machine is a mechanical apparatus or system that produces espresso coffee in discrete shots by distilling coffee grinded grains with pressurized heated water. The apparatus typically includes at least the components illustrated in FIG. 1, namely, a water supply 106 that may include a water vessel or a direct supply by a main water supply pipe. A typical espresso machine also includes a water filter 108 for water cleaning/purification, a pump 110 to pressurize water, and a controlling apparatus 112 to adjust the time and water volume of a single coffee distilling event, or an event of a single coffee shot production, usually acting on the machine pump. A sensor measures water pressure after the pump 110, a boiler 116 heats the water, and a sensor 118 measures water temperature after the boiler. A flow valve 120 assures a specific flow of water before reaching a grouphead 122, which couples with a portafilter 124 that contains the grained coffee to be distilled. The grained coffee comes from a grinder that includes a coffee beans vessel 126 and a grinder apparatus 128.

Typically these types of coffee machines are calibrated via the controlling apparatus 112, which is a PLC that acts on the coffee machine's pump 110. Other indicators of the coffee machine's operational status come from indications read on the water pressure sensor 114 and the water temperature sensor 118.

BRIEF SUMMARY OF THE INVENTION

The method described herein can be applied on single coffee machines and on networks of coffee machines. The instant invention provides monitoring, scoring, and annotating of physical and operation properties of the coffee machine at any given time, according to automatic monitoring of a) physical and operation variables and b) manual input from end-users, such as the end-users' criteria. The invention also illustrates the scoring results for optimal coffee machine calibration settings purposes for a specific coffee machine and other end-user purposes such as coffee production and power consumption appraisal for a specific coffee machine and also for a network of specific coffee machines.

BRIEF DESCRIPTION OF THE SEVERAL VIEWS OF THE DRAWINGS

The instant invention will be better understood with specific reference to the following several views of the drawings.

DETAILED DESCRIPTION OF THE INVENTION

Figure 1:
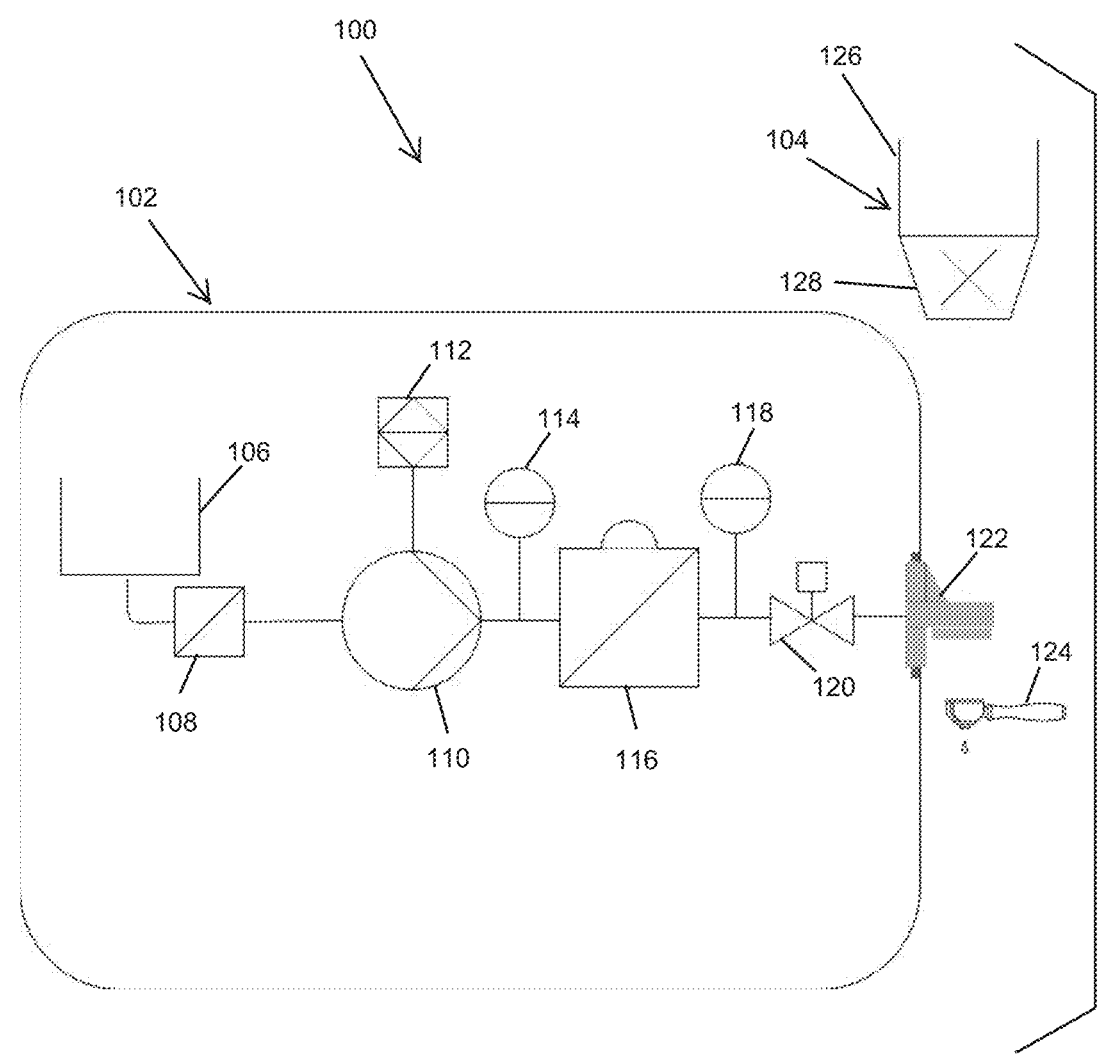
FIG. 1 is a diagram illustrating typical components of an automatic espresso machine.
Figure 2:
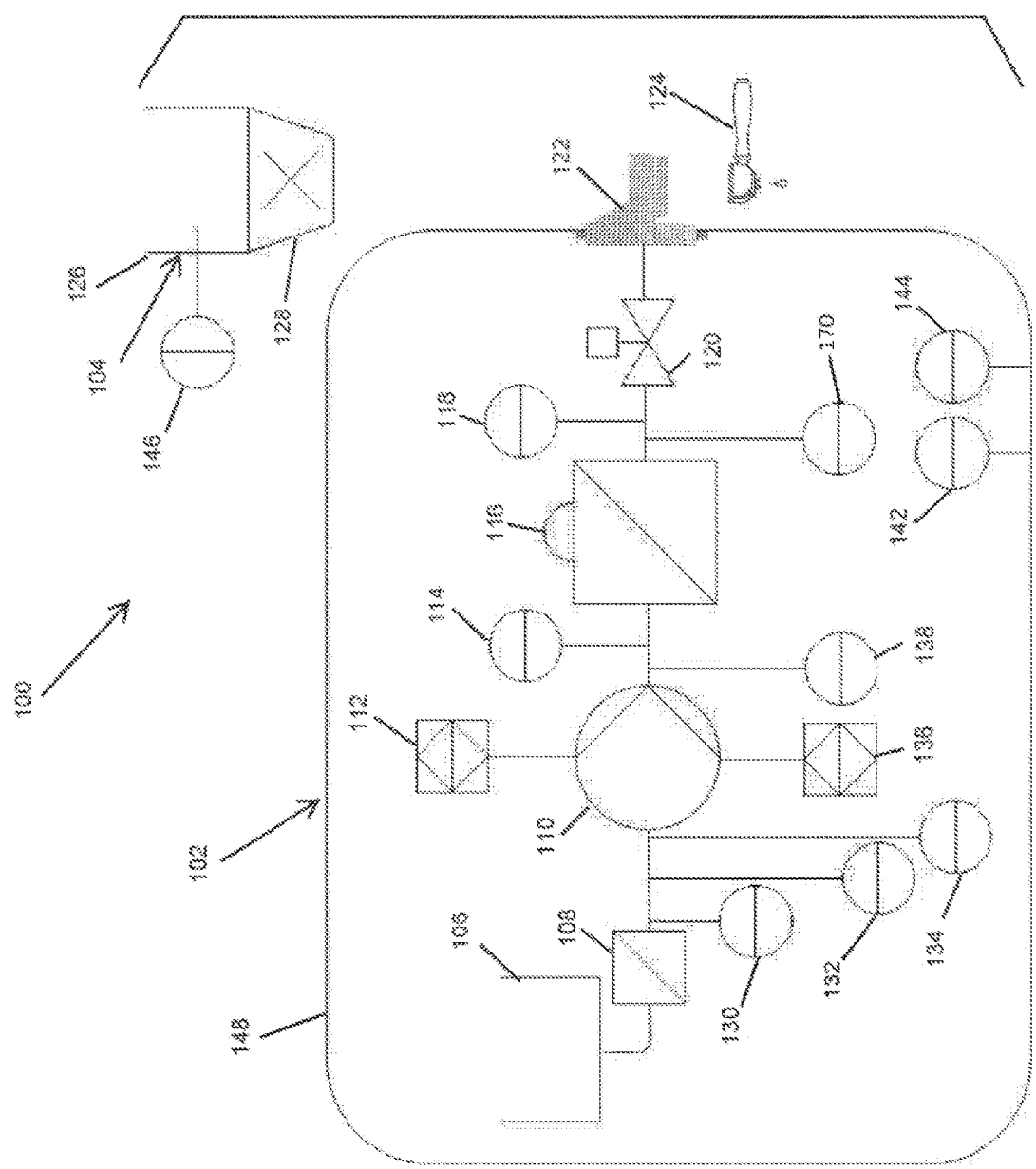
FIG. 2 is a diagram illustrating the typical components of an automatic espresso machine along with components of an embodiment of the instant device.

The invention is a novel method for real time automatic scoring of physical and operational properties of an automatic espresso or coffee machine 102 for both mechanical and end-user optimal use criteria. The method utilizes a sensory reading device 170 (hereinafter, the "device") that is able to communicate over standard and proprietary network protocols with sensors and with other devices of the same type over direct, peer to peer, or standard network or internet connections via the components illustrated in FIG. 2. The device 170 is a component of the coffee production system 100, or espresso system, which includes the espresso machine 102 and grinding machine 104.

Figure 3:
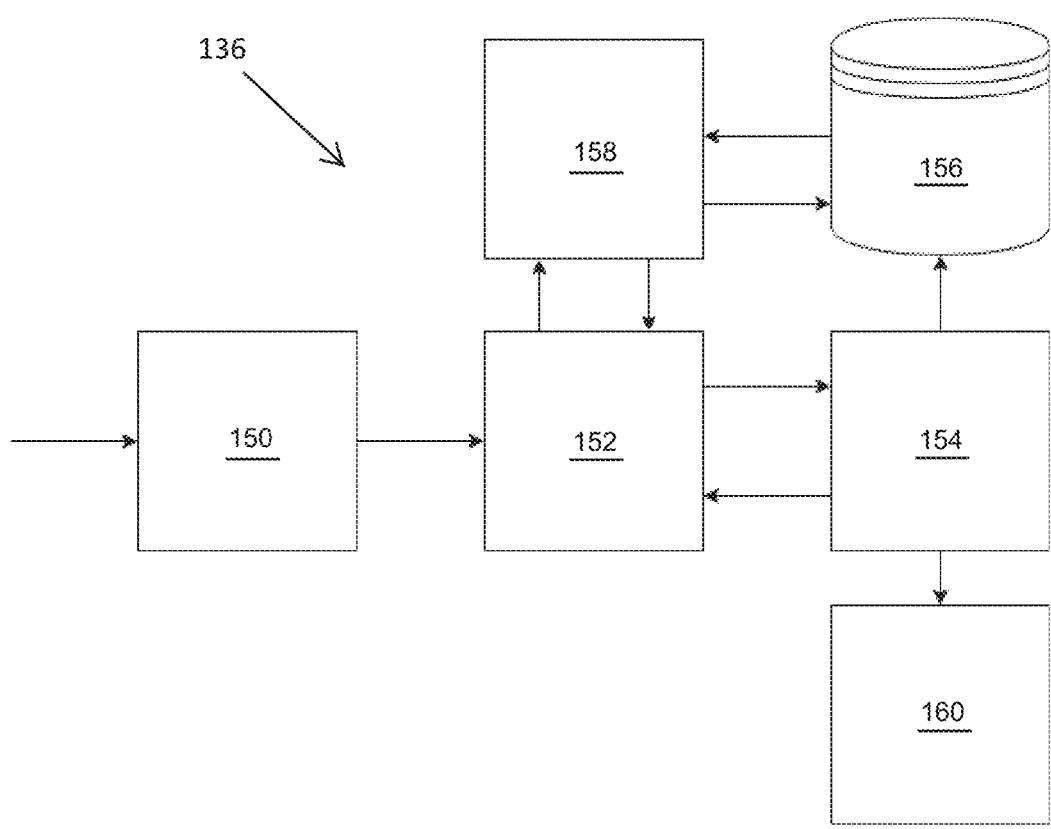
FIG. 3 is a diagram of a computing apparatus of the instant device provided in FIG. 2.
Figure 4:
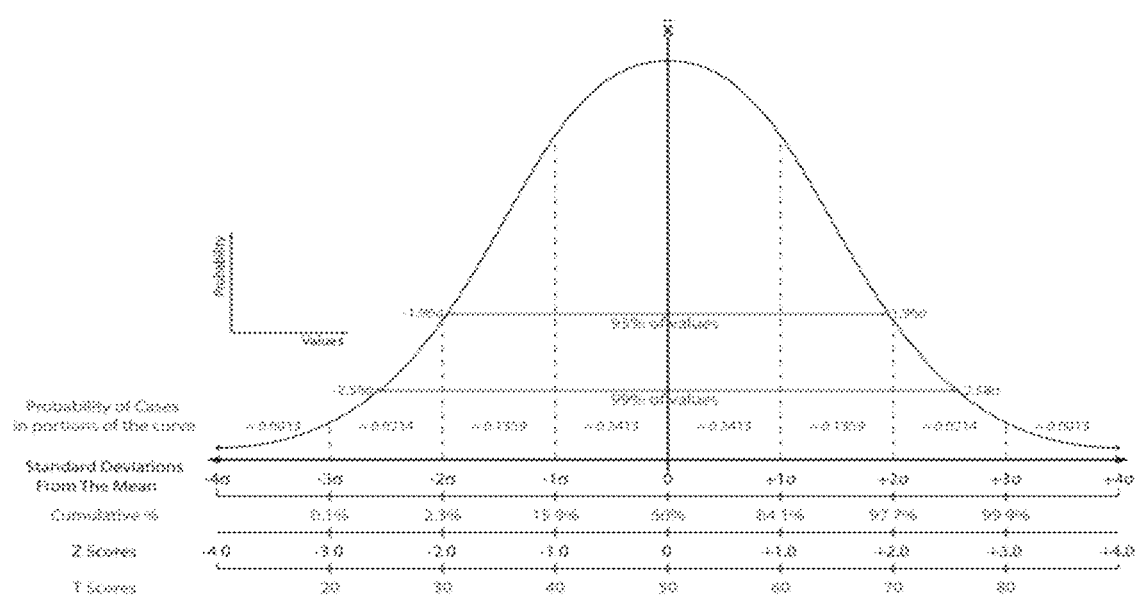
FIG. 4 is a diagram of a bell curve using standard deviation scoring or normal distribution.
Figure 5:
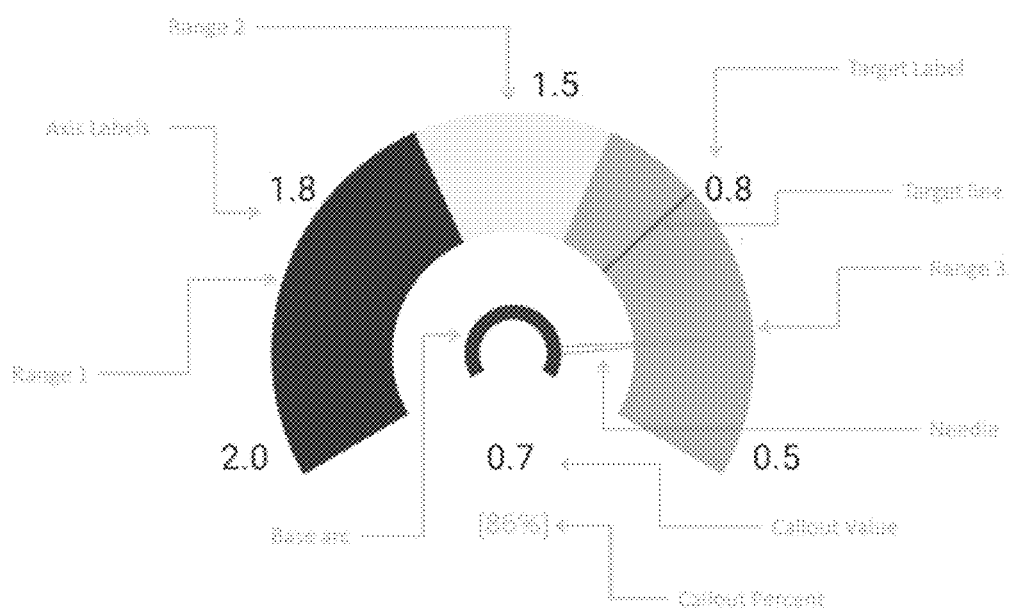
FIG. 5 is a diagram of a gauge of the instant device for providing a scoring scheme.

The main purpose of the device 170 is to compute whether all readings, whether automatic or manual, of the physical and machine operation properties that impact coffee production in a coffee machine are within optimal operation limits or optimal use criteria, and to communicate the results via an interface component for human interaction purposes. The device is able to compute and store information via its computing apparatus 136. The computing apparatus 136 is illustrated in FIG. 3 and includes a communication component 150, which is a computing subsystem responsible for gathering data from devices/sensors of the espresso machine 102 and also transferring settings or firmware to the device. A message queue component 152 is a computing subsystem responsible for queuing data pipes and helping communication between other components of the apparatus 136 in order to archive a high availability and high performance architecture. The processing component 154 is a computing subsystem that processes recommendation algorithms, validates data, transforms data, and sends the data to a data store 156. The data store 156 is a computing subsystem that stores any kind of data produced by the processing component 154 and the interface component 158. The interface component 158 is a computing subsystem that exposes interfaces (API, Web Applications, Mobile Applications) for the exchange of information with humans, external computer hardware, software, etc. The notification component 160 is a computing subsystem that produces notifications and system events.

The device 170 is a printed circuit board that is connected to both digital and analog sensors. The sensors measure physical properties that impact the coffee production and other coffee machine operation metrics. Specifically, the sensors measure coffee production through physical variables that contribute to the production of a single coffee slot, such as the grind, dose, and water properties, which include pressure, temperature, quantity, and quality. The water properties are measured in the following units: pressure in PSI, temperature in degrees (Celsius or Fahrenheit), quantity in volume per time (cubic meters per second), quality for hardness in parts per million (ppm), ORP (oxidation-reduction potential) in millivolts, and acidity or basicity in PH logarithmic scale. The grind is measured in grinder cutter settings (degrees of cutting the coffee) and the dose in grains of coffee.

Overall machine hygiene (normal operation) can be linearly deduced by the level and distribution characteristics of sound produced by the machine and the level and distribution over time characteristics of the vibrations produced by the machine. The sound is measured by decibels and the vibrations are measured as statistical peaks of acceleration.

To measure water pressure, the device 170 is connected to a pressure sensor 138 located between the machine pump 110 and the boiler 116. The device 170 is connected to a temperature sensor located between the boiler 116 and the flow valve 120 that measures the water temperature. For water hardness, the device 170 is connected to a turbidity sensor 130 placed in the water supply 106 after any filtration apparatus 108. For water acidity or basicity, the device 170 is connected to a PH sensor 132 placed in the water supply 106 after any filtration apparatus 108. For water ORP, the device 170 is connected to an ORP sensor 134 placed in the water supply 106 after any filtration apparatus 108. Coffee vendors assign exact coffee grind metrics per coffee type, and humidity is the main contributing variable for finetuning the grind variable given by the vendor. A wireless sensor 146 is deposited in the grinder apparatus 128 to stream humidity data in real time. The system 170 can directly measure total coffee volume produced per a specific number of coffee shots per specific time via the calibration value, "Coffee shot time," for coffee production time or water volume needed per coffee shot in each grouphead 122. Practically, the system 100 measures directly the time the pressurized and heated water distills coffee in the grouphead 122. In this way, the system 100 produces the indirect median dose of coffee grams per coffee shot for a specific coffee volume produced over a specific time duration. As an example of an indicative extraction, about 1 fluid ounce is usually extracted in 30 seconds, and ristretto extraction is calibrated for the ⅔ of the espresso volume (about 20 seconds extraction time).

The system 100 measures multiple machine usage variables directly via the sensors previously described. The device 170 programmatically registers events according to whether the machine is in coffee production or cleaning mode based on the time and volume calibration metrics for dose as described above. Based on the same calculations, the device 170 annotates events, when on production mode, into "ristretto," "single," or "lingo" events. The device 170 registers vibrations directly via an accelerometer sensor 142 placed in a non-moving part of casing 148 of the machine 102. The device 170 registers noise directly via a sound level microphone sensor 144 placed in a non-moving part of the casing 148 of the machine 102.

It is important to note that all device 170 sensors 130, 132, 134, 138, 142, 144, and 146 are connected to the machine 102 and 104 components as described above completely unattached with any controlling apparatus, digital or mechanical, that a coffie machine might include for any operational monitoring such as the PLC apparatus usually installed in such machines for process controlling or any other purposes.

The device 170 registers the machine type as a semantic annotation for a machine ID via manual input by the operator end-user. The device 170 registers the machine group as a semantic annotation for a machine ID via manual input by the operator end-user. The device 170 also programmatically registers/assigns a specific machine ID to a UPS location that reads automatically via a connected UPS sensor on the PCB board of the device. The device registers the coffee variant as a semantic annotation for a machine ID for a specific time period via manual input by the operator end-user. The device registers the coffee vendor as a semantic annotation for a machine ID for a specific time period via manual input by the operator end-user. The device 170 registers the time each grouphead 122 operates to produce a coffee shot for each of three coffee types, Ristretto, Single, and Lungo, via manual input by the maintenance end-user. For example, the maintenance end-user sets the device 170 in calibration mode and presses the Ristretto button on the coffee machine 102. Then the calibration algorithm on the device 170 automatically sets the time and volume required for coffee production/cleaning mode. The maintenance end-user needs to repeat this for each type of coffee (Ristretto, Single, and Lungo).

The domains of the system 100 include a local domain and a network domain. The local domain includes the location of the coffee machine 102, the corresponding grinder 104, and the corresponding physical, technical, and semantic environment. The network domain includes the aggregation of coffee machines (network), Machine Group [1 . . . n], according to physical, technical and semantic classifiers.

The end-users of the system include coffee machine owners (business owner and maintenance staff), the network owner, and the coffee vendor. Classification of persons is allowed in more than one user classes.

The main purpose of the method is to compute and present whether all the readings, automatic or manual, of the physical and machine operation properties that impact coffee production in a coffee machine are within optimal operation limits or optimal use criteria. In order to enumerate the correlation of the system's readings to optimal use criteria, an event-based scoring scheme is presented. Each device event is registered as a discrete system occurrence along with all device readings (automated or manual) and framed by specific time-start and time-end points. All events for each machine ID (a unique coffee machine) are essentially repetitions of a similar physical process or test characterized by identical components and physical properties under homogeneous physical and technical environmental settings, with each event having no dependency whatsoever with the others. Thus, the events, along with the event readings, after a series of event occurrences, follow the normal distribution with a specific variance and standard deviation of any of the event readings for these event occurrences.

Thus, the scoring for any of the readings is the Z score of the reading(s) for a specific time period for a single coffee machine. The Z score represents the distance between the raw reading and the population mean in units of the standard deviation. Z is negative when the raw reading is below the mean and positive when above. The device computes and presents the Z score for any of the readings described herein for any given time period that readings have been registered and stored. In this way, the end user has an instant view for each of the readings' Z score over a period of time that is a clear measure of whether the physical and/or operation property of this reading falls within the expected range of operation or not. The accepted range of operation is registered in the device as end-user inputs via the computing interface in the form of operation thresholds. The device 170 compares the Z-scores and the thresholds at any given time automatically annotating the results as, "normal operation", "operation under caution", or "non-normal operation," accordingly. Furthermore, each event series or can be further semantically annotated by the end-user by any of the manual inputs as described herein to correlate end-user semantics to event series/occurrences automatic scores. Moreover, since devices can communicate with each other utilizing internet connections, it is technically possible to conduct the same scoring method for any selection of machine groups and to extract mathematically solid statistical aggregations and results of event readings, provided the classification of these machine groups falls into the homogenous physical and technical environmental settings criterion, such as, for example, a machine group for the same machine type.

Thus, the system 100 has the operational ability to automatically produce the Z-scores for any of the following properties: water pressure, water temperature, water quality (Hardness, PH, ORP), grinder humidity (for grinder setting purposes), machine noise, and machine vibrations.

Furthermore, because any aggregation of the readings for a group of coffee machines, after a series of occurrences, follows the normal distribution with a specific variance and standard deviation, just as it is true for a single coffee machine, Z-scores can be assigned in all of the readings for any type of aggregations and groupings such as the ones that follow the manual inputs, including machine type, machine group, coffee variant, or coffee vendor, where outliers can be statistically registered in the system and outputs can be statistically normalized. In this way, human error for any manual input is minimized, specifically for the coffee shot time manual input that impacts computations regarding coffee production metrics such as production efficiency.

Thus, the Z-scoring for all the automatic and the normalized non-automatic readings applies to the following corresponding, but not restrictive list of:

Coffee machine operation efficiency;
Coffee production efficiency with semantics such as coffee type, variant, vendor etc.;
Machine indirect operation indicators, such as coffee machine internal sound level and vibrations;
Machine environment physical properties impacting appraisal, such as water supply quality, humidity for grinder calibration settings; and
Scoring metrics for a network of coffee machines, such as the aggregation and statistical outcomes for all the reading scores for a specific number of coffee machines classified under end-user semantics such as coffee type, coffee variant, coffee vendor, geographical areas, market business environment, weather (for humidity), etc.

The invention claimed is:

1. A coffee production system providing real-time supervisory scoring scheme based on automatic monitoring of operation processes variables and end-user annotations and scoring criteria, the system comprising:
   a coffee machine having at least a water supply providing water through a water filter to a pump, the pump pressurizing the water, a controlling apparatus to adjust time and water volume of a single coffee distilling event acting on the machine pump, a boiler that heats the water, a flow valve that controls flow of the water to a grouphead, which removably couples with a portafilter configured to hold ground coffee;
   sensors for measuring physical properties that impact coffee production;
   a grinding machine having a coffee beans vessel and a grinder apparatus; and
   a sensory reading device being a circuit board configured to compute and store information via a computing apparatus, the computing apparatus having a message queue component, a processing component, a data store, an interface component, and a notification component,
   wherein the sensory reading device is connected to the sensors to collect multiple machine usage variables from corresponding physical data to compute and present all readings, automatic or manual, of the physical and machine operation properties that impact the coffee production in the coffee machine are within optimal operation limits or optimal use criteria,
   wherein the sensory reading device and the sensors are connected to the coffee machine and the grinding machine but completely unattached to the controlling apparatus, and
   wherein the sensory reading device registers a machine type as a semantic annotation for a machine ID via manual input by an operator end-user, registers a machine group as a semantic annotation for the machine ID via manual input by the operator end-user, registers and assigns the machine ID to location based services that reads automatically via a connected GPS sensor on a PCB board of the sensory reading device, registers a coffee variant as a semantic annotation for the machine ID for a specific time period via manual input by the operator end-user, registers a coffee vendor as a semantic annotation for the machine ID for a specific time period via manual input by the operator end-user, registers time each grouphead operates to produce a coffee shot for each of three coffee types, ristretto, single, and lungo, via manual input by the maintenance end-user, and a calibration algorithm on the sensory reading device then automatically sets a time and a volume required for the coffee production or a cleaning mode.

2. The coffee production system of claim 1, wherein the sensory reading device measures the multiple machine usage variables directly via the sensors and registers events according to whether the system is in a coffee production mode or the cleaning mode based on time and volume calibration metrics.

3. The coffee production system of claim 2, wherein the sensory reading device annotates the events, when in the coffee production mode, into ristretto, single, or lungo events.

4. The coffee production system of claim 1, wherein the system includes a local domain and a network domain, the local domain including a location of the coffee machine, the grinding machine, and corresponding physical, technical, and semantic environment, and the network domain including an aggregation of coffee machine networks, according to physical, technical, and semantic classifiers.

5. The coffee production system of claim 4, wherein the system automatically produces a Z score for the following properties based on collected multiple machine usage variables, including water pressure; water temperature; water volume; water quality, including hardness, pH, and oxidation-reduction potential (ORP); grinder humidity; machine noise; coffee extraction time; and machine vibration.

6. The coffee production system of claim 5, wherein the system computes and presents the Z score for any of the properties for any given time period that multiple machine usage variables have been registered and stored to provide the end user with a measure of whether the one or more of the properties fall within an accepted range of operation, the accepted range of operation being registered in the sensory reading device as end-user inputs via the computing interface in the form of operation thresholds.

7. The coffee production system of claim 1, wherein the sensory reading device registers vibrations directly via an accelerometer sensor placed in a non-moving part of a casing of the coffee machine and registers noise directly via a sound level microphone sensor placed in the non-moving part of the casing.

* * * * *